United States Patent [19]

Onnes

[11] Patent Number: 4,915,850
[45] Date of Patent: Apr. 10, 1990

[54] METHOD AND APPARATUS FOR SEPARATING GRANULATE FROM A VISCOUS SUSPENSION

[75] Inventor: Pieter R. Onnes, Amsterdam, Netherlands

[73] Assignee: Mudcleaning Services Amsterdam B.V., Netherlands

[21] Appl. No.: 251,661

[22] Filed: Sep. 30, 1988

Related U.S. Application Data

[63] Continuation-in-part of Ser. No. 62,649, Jun. 16, 1987, abandoned.

[30] Foreign Application Priority Data

Jun. 19, 1986 [NL] Netherlands .......................... 8601595
Oct. 28, 1986 [NL] Netherlands .......................... 8602703

[51] Int. Cl.⁴ ...................... B01G 19/00; B01D 33/04
[52] U.S. Cl. .................... 210/771; 210/808; 210/805; 210/773; 210/416.1; 210/400; 210/396; 210/384; 175/66; 175/206; 34/16
[58] Field of Search .............. 210/783, 771, 770, 406, 210/401, 400, 416.1, 384, 396, 805, 806; 175/66, 206; 34/16

[56] References Cited

U.S. PATENT DOCUMENTS

| | | | |
|---|---|---|---|
| 2,104,785 | 1/1938 | Akeyson | 210/384 |
| 2,848,113 | 8/1958 | Patterson et al. | 210/396 |
| 3,559,807 | 2/1971 | Reilly . | |
| 3,891,549 | 6/1975 | Carmel . | |
| 4,146,483 | 3/1979 | Lee | 210/400 |
| 4,154,644 | 5/1979 | Ericsson | 210/400 |
| 4,255,269 | 3/1981 | Timmer | 210/783 |
| 4,350,591 | 9/1982 | Lee | 210/400 |
| 4,404,099 | 9/1983 | Austin | 210/400 |
| 4,477,358 | 10/1984 | Heintges | 217/783 |
| 4,545,969 | 10/1985 | Diekotter . | |
| 4,639,258 | 1/1987 | Schellstede et al. | 175/66 |
| 4,750,920 | 6/1988 | Manuel et al. | 210/406 |

FOREIGN PATENT DOCUMENTS

| | | |
|---|---|---|
| 0105183 | 4/1984 | European Pat. Off. . |
| 3222235 | 12/1983 | Fed. Rep. of Germany . |
| 1418894 | 10/1965 | France . |
| 2139007 | 1/1973 | France . |
| 2180049 | 11/1973 | France . |
| 2403813 | 4/1979 | France . |
| 7804994 | 11/1979 | Netherlands . |
| 1298070 | 11/1972 | United Kingdom . |

Primary Examiner—Richard V. Fisher
Assistant Examiner—Matthew O. Savage
Attorney, Agent, or Firm—Roylance, Abrams, Berdo & Goodman

[57] ABSTRACT

Method and apparatus for separating and recovering a granulate from a viscous suspension containing the graulate. The suspension is placed in a layer on an endless sieve belt guided around return rollers and effecting a separation into a sieve residue of the granulate which remains behind on the belt, and a stream of material passing through the belt. The stream of material is collected between the forward and backward runs of the sieve conveyor belt. The separated granulate is dumped from the conveyor belt. As the layer of the granulate containing suspension is dispensed on the sieve conveyor belt, at least one free edge extending across the sieve conveyor belt is formed and maintained. A stream of air passes downwardly through the sieve conveyor belt.

18 Claims, 1 Drawing Sheet

METHOD AND APPARATUS FOR SEPARATING GRANULATE FROM A VISCOUS SUSPENSION

REFERENCE TO RELATED APPLICATION

This application is a continuation-in-part of copending U.S. application Ser. No. 062,649, filed June 16, 1987, now abandoned, the subject matter of which is hereby incorporated by reference.

FIELD OF THE INVENTION

The present invention relates to a method and apparatus separating and recovering a granulate from a viscous suspension containing the granulate by placing the suspension in a layer on an endless sieve conveyor belt and effecting a separation into the granulate as sieve residue on the belt, and into a stream of suspension passing through the belt. The stream of suspension is collected between forward and backward runs of the sieve conveyor belt. The separated granulate is dumped from the conveyor belt.

BACKGROUN OF THE INVENTION

A similar system is disclosed in Netherlands patent application No. 7804994, and relates to the recovery of a basic suspension or slurry from spent, viscous drilling mud. The basic suspension is suitable for preparing a fresh drilling mud for use in boring a hole in the earth by rotary drilling in prospecting for oil or gas. As such, the above prior process is commensurate with developments in the oil industry over the last 10-15 years in reducing the discharge of spent drilling muds during the drilling phase of oil and gas wells, attempting to satisfy stricter environmental requirements. In addition to the adapted selection of drilling mud types containing raw materials which are 'friendly' to the environment, the technology of cuttings removal has been greatly improved.

Drilling muds may be slurries on an oil basis or on a water basis and may contain, as described in Dutch patent application No. 7804994, various insoluble solids as additives, for example, barite and gypsum. The spent slurry additionally contains the solids loosened during boring, called cuttings, as a granulate.

The recovery of the basic suspension or slurry in practice requires that the cuttings be separated from the spent mud as selectively as possible. The remaining basic slurry contains a larger or smaller part of the various additives and can be re-used as a drilling mud as such or after adjustment of its composition.

The prior process is effected in two distinct main steps, that is, a sieving step, in which the spent viscous suspension is separated into a solid sieve residue remaining behind on the sieve and a stream of material passing through . the sieve, which material is stored in a reservoir, and a processing step in which the solid sieve residue is processed further. The solid sieve residue separated in the prior method contains, in addition to the cuttings, a portion of the insoluble additives. In the processing step, the solid sieve residue is first dried and only then processed, preferably by effecting a separation of the solid components into layers on the basis of differences in specific gravity. The cuttings thus obtained are discharged, while the additives obtained can be re-used in preparing drilling mud.

The sieving step forming part of the prior process comprises, in turn, two stages, namely a sieving or filtering stage under the influence of gravity, and subsequently a filtering state under pressure. The entire sieving step is effected in the prior process by a sieving belt passed around return rollers with the filtering step to be carried out under pressure created by maintaining a partial vacuum under the forward run or sieving run of the sieving conveyor belt.

With a partial vacuum under the sieving run, the entire sieving run must be covered with the spent suspension. Thus, the cuttings are not dried and are wet with suspension when dumped from the sieve belt requiring further treatment. Additionally, the use of a partial vacuum disadvantageously involves high power costs.

SUMMARY OF THE INVENTION

An object of the present invention is to provide a method and an apparatus for separating granulate from a viscous suspension containing the granulate which are considerably simplified, can be better controlled and have improved efficiency.

A further object of the present invention to provide a method and an apparatus for separating granulate from a viscous suspension containing the granulate which are more generally applicable, and in which the separated and recovered granulate is not only a waste material, such as the cuttings in the above-described method of processing spent drilling mud, but may alternatively be a main product. One example is the so-called coal slurry process, in which pulverized coal is transported, made into a suspension in a carrier liquid, with the viscosity of the slurry being adjusted to a desired value by adding suitable additives. At the destination the pulverized coal should be re-separated and the carrier liquid can be recycled.

The foregoing objects are obtained by a method of separating and recovering granulate from a viscous suspension containing the granulate, comprising the steps of placing a layer of the suspension containing granulate on an endless sieve belt to only partially cover and to form at least one free edge of the suspension on a generally horizontal, upper run across the upper run, separating the granulate as sieve residue on the upper run of the sieve belt and dumping the granulate from the sieve belt at one and of the upper run, passing the suspension through the sieve belt upper run, collecting the suspension between the upper run and a lower run of the sieve belt, and passing a stream of air downwardly through the sieve belt upper run by ventilator means.

The invention is based on observations made in experiments with spent drilling muds. When the layer of spent slurry has a free edge exposed to a stream of air generated by ventilator means and passed downwardly through the sieve conveyor belt, calving or separation of the slurry layer occurs at the slurry layer free edge. During the calving, the spent slurry is separated into a relatively thin layer of cuttings remaining behind on the sieve conveyor belt and a stream of material passing through the sieve belt. This stream of material is a suspension of a composition that can serve as a basis for preparing fresh drilling mud by some adjustment of its composition. The composition of the stream of material can also be immediately suitable for re-use as a drilling mud and can be recycled to the drilling site. The layer of cuttings remaining behind on the sieve belt, as obtained in the system according to the present invention contains little, if any, additives from the drilling mud, and therefore, renders further processing of the cuttings unnecessary.

A viscous suspension, as used herein, is a suspension whose viscosity, by nature or after adjustment, is such that the suspension can be used as a carrier for the granulate during transport thereof. A suitable value of the viscosity in this regard corresponds to a funnel viscosity of at least about 40 sec.

According to the present invention, the layer of spent suspension placed on the sieve belt should have a free edge across the sieve belt. That is, the surface of the sieve conveyor belt, located between its return rollers, must not be completely covered with the layer. In other words, it must be ensured that a portion of the sieve belt surface is left free. A free forward edge or front edge of the suspension can be formed on the belt, as viewed in the direction of travel of the sieve belt, in the region between the return rollers by attuning, in a given sieve conveyor belt with a given mesh size, the rate of supply of spent suspension and the velocity of the sieve conveyor belt to each other. These parameters are relatively adjusted producing an equilibrium condition between the supply of spent suspension and the flow of filtered suspension through the sieve belt in which the fluid portion of suspension cannot reach the solids granulate discharge of the sieve belt and forms a free end across the sieve belt between the dispensing means and the granulate discharge.

The velocity at which the air stream passes downwardly through the sieve conveyor belt partly effects the calving process at the free edge. A suitable air stream velocity for the purposes of the present invention averages 4–5 meter/sec.

Mesh widths for the sieve belt are partly dependent upon the nature of the spent suspension, for example, its viscosity. 60- or 80-mesh sieves are suitable, but sizes of 40 mesh or 120 mesh (or finer) are suitable under certain conditions.

In the known separation process, the spent suspension is exposed in the form of a continuous layer to a considerable pressure differential across the layer of spent suspension, which pressure is produced by maintaining under the sieving run of the belt carrying the layer a greatly reduced pressure, for example, by means of a vacuum pump. In contrast, in the method according to the present invention, the sieving surface is not completely covered with a continuous layer and that the interrupted layer is exposed to the effect of a strong air displacement through the sieving belt, brought about, for example, by one or more blowers.

The method according to the present invention is considerably simpler to control and, by definition, insensitive to any disturbance of the coherence of the layer carried by the sieving belt. In the prior method, such a disturbance immediately causes a considerable reduction in efficiency of the vacuum pump. Moreover, a vacuum pump is considerably less economic than an air displacing or ventilator means such as a blower as far as power consumption is concerned.

In the method according to the present invention, the separation effects can be promoted by subjecting the layer of suspension on the sieving belt to vibration in combination with the air stream.

The foregoing objects of the present invention are also obtained by an apparatus for separating and recovering granulate from a viscous suspension containing the granulate, comprising an endless sieve belt having a generally horizontal upper run and a lower run; a receptacle having an upper support with a plurality of vertical through openings underlying said upper run of said belt, said receptable being mounted between said upper and lower runs; dispensing means, mounted adjacent a downstream end of said upper run, for placing a layer of suspension containing granulate on said upper run and for forming the layer with at least one free edge extending across said upper run; first means for receiving, collecting and discharging suspension passed through said upper run and into said receptacle through said upper support; second means for collecting and discharging granulate collected as sieve residue on said upper run of said sieve belt; and ventilator means, coupled to said receptacle, for generating a stream of air passing downwardly through said upper run and into said receptacle, said ventilator means including blower means, coupled by conduits to said receptacle, for drawing air into said receptacle through said openings in said upper support.

The dispensing means can have an outlet spaced at least about 20 cm above said sieve run. By pouring the viscous suspension to be separated onto the sieve belt from a certain height, the impact force generated at the sieve belt promotes its separation effect.

In the apparatus according to the invention, the sieve run of the sieve belt may be supported on one or more liquid discharging means arranged to exert a scraping action on the sieve conveyor belt during operation. Specifically, the arrangement may provide a non-supported portion of about 20 cm between the supporting portions of 10–20 mm and between the area of first contact of the supplied viscous suspension with the sieve run and the first liquid discharging means located downstream thereof.

Examples of suitable liquid discharging means with a scraping action are strips and so-called foils, such as the hydrofoils used in the papermaking industry. Passing the sieve run of the belt over the liquid discharging strips may, among other things, lead to a reduced pressure locally under the sieve belt directly downstream of one or more strips, which again promotes the passage of material through the sieve belt.

Both the pouring of the viscous suspension to be treated on the sieve belt and the passage of the sieve belt over the liquid discharging means, in combination with maintaining a relatively high belt velocity and rate of air displacement, generate such strong vibrations in the sieve belt that, particularly in the case of spent suspensions with a gel structure, a favorable separation result is promoted which exceeds the sum of the results of each of these measures separately. To further enhance this effect, the apparatus according to the invention may be provided with one or more vibrating means engaging with the sieve belt.

The combination of process conditions can be selected according to the present invention virtually to achieve complete separation over a surprisingly short path of travel, whereby virtually exclusively the cuttings remain behind on the sieve conveyor belt. The cuttings are substantially dry to the touch. The insoluble additives are practically completely entrained by the stream of material passing through the sieve conveyor belt. This stream of material is essentially a mixture of the basic suspension to be recovered and air. After separation of the basic suspension, it can be recycled to the drilling rig as such or with minor adjustment of its composition. A second step, in which the remaining solid sieve residue is processed to recover any solid additives contained therein is therefore unnecessary in the method of the present invention.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF PREFERRED EMBODIMENT

Figure 2:
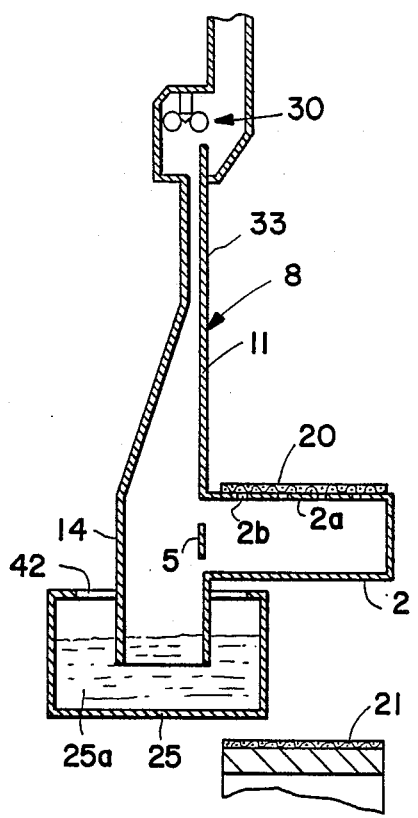
FIG. 2 is a front elevational view in section diagrammatically illustrating the apparatus taken along line 2—2 of FIG. 1.

Referring to the drawings, a separating apparatus is diagrammatically or schematically illustrated, comprising a sieve belt 1 with a forward, sieving or upper run 20 and a return or lower run 21. Belt 1 is passed around driving roller 23 and return roller 22. Arrows P indicate the direction of rotation of the respective drive and return rollers 23 and 22 and, accordingly, show the direction of travel of the belt.

Disposed in the space between sieving run 20 and return run 21 of sieve belt 21 are three open-topped receptacles 2, 3 and 4. Each receptacle comprises an upper support formed by a plurality of members 2a spaced in the longitudinal direction of the apparatus. The spaces between members 2a define vertically extending openings providing access to the interior of the receptacles. Members 2a define a plane at the top of the receptacles which is spaced a relatively short distance from the underside of sieving run 20. The series of receptacles 2, 3 and 4 substantially spans the distance between driving roller 23 and return roller 22.

Figure 1:
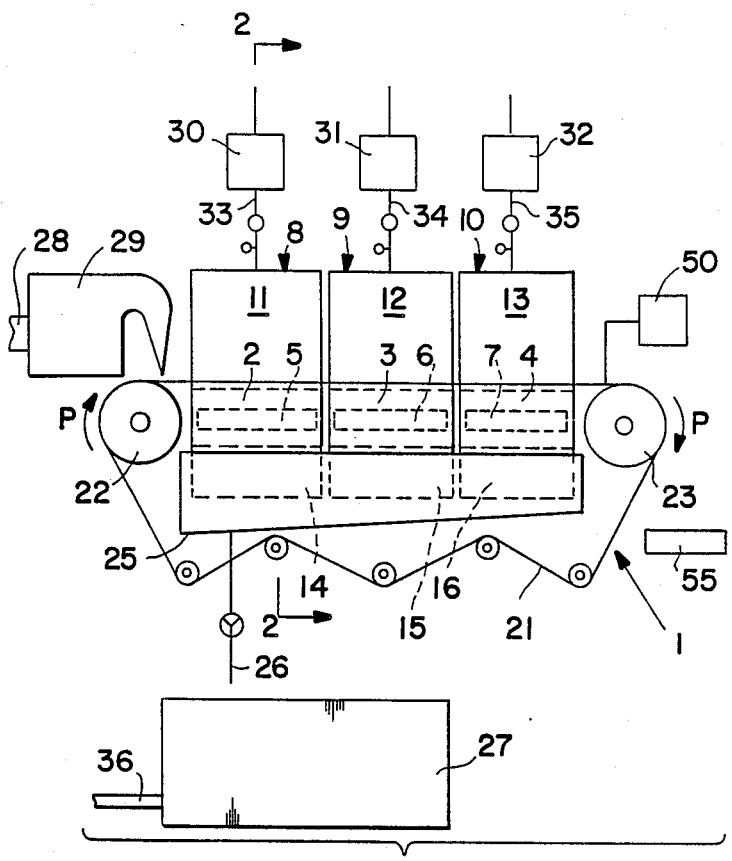
FIG. 1 is a side elevational view diagrammatically illustrating an apparatus for separating granulate from a viscous suspension according to the present invention.
Figure 3:
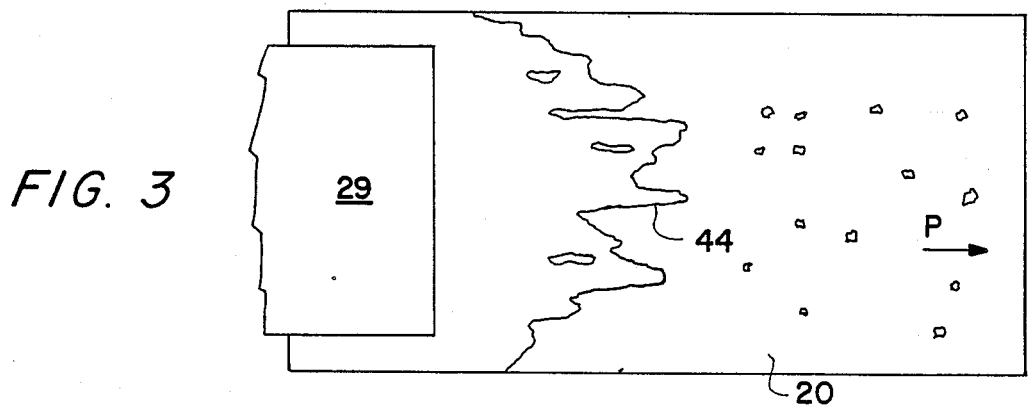
FIG. 3 is a top plan view of the sieve belt of the apparatus of FIG. 1 with the suspension thereon defining a free forward edge.
Figure 4:
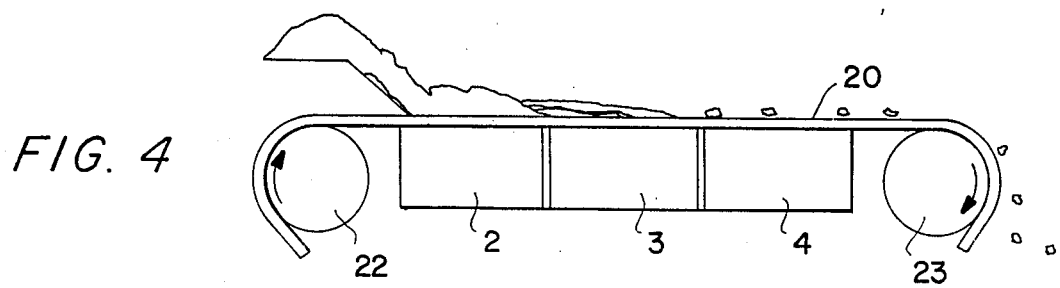
FIG. 4 is a side elevational view of the apparatus of FIG. 3.

Receptacles 2, 3 and 4 are connected to duct systems 8, 9 and 10, respectively, as illustrated in FIG. 1. Duct systems 8, 9 and 10 have vertically extending respective ducts 11, 12 and 13 coupled to the respective receptacles. The upper ends of ducts 11, 12 and 13 are connected through respective lines 33, 34 and 35 to respective blowers 30, 31 and 32. The lower ends of ducts 11, 12 and 13 are connected to ducts 14, 15 and 16, respectively.

As typically illustrated in FIG. 2 for receptacle 2, duct 14 opens laterally into the interior of receptacle 2 and terminates at its open lower end in buffer vessel 25. The receptacle extends in a cantilever manner from duct 14 to facilitate belt mounting and removal. Buffer vessel 25 collects the basic suspension which has been separated from the granulate by the sieve conveyor belt and passes through the sieve conveyor belt as a stream of material.

Since the lowermost end of duct 14 is immersed in the basic suspension 25a contained within vessel 25, the lower end of the duct 14 is sealed by a liquid seal, where the liquid is the basic suspension. Buffer vessel 25 is open at its top 42 to provide atmospheric pressure at the surface of basic suspension 25a in vessel 25. By use of this liquid seal, the air flow created by the blowers draws air downwardly from above sieve run 20, through the belt, into receptacle 2 and then upwardly through duct system 8, while preventing air from passing upwardly from the lowermost end of duct 14 located within vessel 25.

Ducts 11–13 and 14–15, along with receptacles 2, 3 and 4 are substantially flat with a rectangular cross-sectional configuration. Duct 14 opens laterally into the interior of receptacle 2 adjacent the connection of ducts 11 and 14. Since duct systems 9 and 10 are similar to duct system 8, duct systems 9 and 10 are not separately described in detail.

Preferably, an air stream guide 5 is located at the interface of the interior of receptacle 2 and duct 14. Similar guide means 6 and 7 are provided at the interface of ducts 15 and 16 connected to ducts 12 and 13, respectively. Air stream guides 5, 6 and 7 function as splash guards preventing the basic suspension which has been separated by the sieve belt from becoming entrained within the air stream and subsequently emitted into the atmosphere.

Spent drilling mud is supplied through line 28 into dispenser 29. Dispenser 29 supplies the spent drilling mud onto the sieve belt for separation. The drilling mud is delivered to the belt from a height for free fall onto the sieve belt.

Buffer vessel 25 is connected through line 26 to reservoir 27. Line 36 extending from reservoir 27 permits recycling of the basic suspension back to the drilling site.

Support members 2a, forming the top of the receptacles, can be a plurality of liquid discharging strips. Such strips are of the type commonly used in the papermaking industry. These liquid discharging strips exert a scraping action on the sieve conveyor belt during operation. The strips are about 10 to 20 mm in width and are spaced apart by a distance of about 20 cm.

In operation, spent drilling mud is continuously supplied through line 28 to dispenser 29. From dispenser 29, the spent drilling mud or suspension is poured onto the sieve conveyor belt in a layer so as to form at the least one free edge 44 extending generally transversely across the generally horizontal sieve run 20. The sieving conveyor belt rotates in a direction indicated by arrows P.

During operation, approximately one-half of the upper run of the sieve belt is covered with drilling mud. Forward of the free edge 44, drying or dried granular particles are conveyed on the sieve belt and are ultimately discharged at the end of the sieve belt adjacent roller 23 into a collecting and discharging device 55.

Under the influence of the blowers, a strong air stream is drawn downwardly from above the sieving run 20, through the sieve run 20, through openings 2b between members 2a, into the receptacles and then upwardly through duct systems 8, 9 and 10. The layer of spent mud or suspension is transported on the conveyor belt 1 in the direction of roller 23. During transport, under the influence of the downwardly air stream through the sieve belt, the liquid components and the solid insoluble components of the basic suspension are virtually entirely discharged from the spent suspension layer through the sieve conveyor belt and are collected in receptacles 2, 3 and 4. The material in the receptacles is conveyed along air guides 5, 6 and 7 into vessel 25. The stream of air is discharged to the atmosphere through ducts 11, 12 and 13, lines 33, 34 an 35 and blowers 30, 31 and 32.

The basic suspension continuously flows through ducts 14, 15 and 16 and maintains the liquid seals in buffer vessel 25. From buffer vessel 25, the basic suspension is conveyed to reservoir 26.

The method and apparatus of the present invention provide a compact unit which is simple and comprises low cost compoents to handle a relatively large volume flow of spent drilling mud, on the order of 3500 liters per minute, in a single pass. The sieve belt is generally a fine mesh with a 80–180 mesh. The sieve belt is usually subjected to relatively low air pressure of less than 150 millibars, and preferably between about 10 and 100 millibars, or about 20 to 100 centimeters of waterhead. This creates an air velocity of about 1 to 10 meters per second, and preferably of about 5 meters per second. This flow enhances the filtration, and dries the cuttings eliminating a need for additional processing. The sieve velocity is between about 10 and 40 per minute, and is preferably between 15 and 30 meters per minute.

With an 80 mesh sieve belt, excellent retrieval of cuttings were retrieved from spent drilling mud. In one example, the well head flow was 3500 liters per minute with an apparent viscosity of 55 seconds mf. The cutting content was 6% by volume.

The spent drilling mud, being discharged onto the sieve belt from a height above the sieve belt, approximately 70 to 90% of the flow goes directly through the sieve belt to the receptacles. The remaining 10 to 30% is induced to pass through the sieve belt by the air flow. A natural vibration from the ventilators and the running of the belt enhances the flow through the belt. When necessary, a suitable vibration device 50 can be coupled to the sieve belt to add a slight vibration to the sieve belt. Although the additional sieve belt vibration increases throughput, it shortens the life time of the apparatus, particularly the sieve belts, and thus, is only used in overflow situations.

The regeneration of spent drilling mud has always been a technological problem that was difficult to solve. The present invention provides a solution that is technologically relatively simple. The invention is also however, applicable to other systems in which one or more solids or granulated particles are dispersed in a viscous liquid, for example, as provided in the preparation on a commercial scale of fruit juice by pressing fruits, for example, the preparation of apple juice from apples. The method according to the invention makes it possible to produce a clear fruit juice, using a sieve belt with which the fruit pulp is separated from the suspension thereof in the fruit juice while simultaneously passing a relatively large stream of air, produced by blowers, through a layer of separated fruit pulp, with a relatively small pressure drop across the pulp layer.

The invention is also applicable to the transportation of granulate material suspended in a quantity of flowing viscous carrier liquid to separate the granulate material at the destination.

By way of illustration, a number of experiments were carried out with drilling mud, using an apparatus according to the invention designed as shown in the drawings.

The sieve belt 1 had a sieve area of about 160×110 cm. The belt velocity was variable from 0 to about 10 m/min. Blowers 30, 31 and 32 had together an air displacement capacity of about 15000 m³ hour, leading to linear velocities of 4-5 m/sec.

The experiments concerned drilling muds on both oil and water basis.

THE RESULTS WERE AS FOLLOWS:

Examples

A. Drilling Mud On Oil Basis

| Mud characteristics: | |
|---|---|
| Specific density: | 1.36 |
| Plastic viscosity | 50 cp* |
| Yield point | 19 lbs/100 sqft* |
| (9.1 Pa) | |
| Gel value 0'/10' | 14/16 lbs/100 sqft* |
| | (0.7–7.7 Pa) |
| Solids content | 16% |
| Water content | 29% |
| Oil content | 55% |
| Sieving capacities achieved | |
| Using 60-mesh sieves | 50 m³ hour |
| Using 80-mesh sieves | 40 m³/hour |

*Measured at ambient temperature

B. Drilling Mud On The Basis Of Fresh Water (So-Called "Spudmud", i.e., Drilling Mud As Used During Initial Drilling)

| Mud characteristics: | |
|---|---|
| Specific density: | 1.15 |
| Viscosity | 40 sec.mf* |
| Plastic viscosity | 9.5 cp |
| Yield point | 7 lbs/100 sqft |
| | (3.4 Pa) |
| Gel value 0'/10' | 5/9 lbs/100 sqft |
| | (2.4–4.4 Pa) |
| Cuttings concentration | 5% Mikhart 130** |
| Sieve capacities achieved: | |
| with 60-mesh sieves | 87 M³/hour |
| with 120-mesh sieves | 30 M³ hour |
| After increasing viscosity | to 90 sec.Mf.: |
| using 80 mesh sieves | 15 m³ hour |

*Running time of the drilling mud, determined by the Marsh funnel
**Ground shells having particle sizes of about 35–325 mesh to simulate cuttings.

C. High-Viscosity Spudmud

| Mud characterisitcs: | |
|---|---|
| Specific density: | 1.12 |
| Viscosity | 130 sec mf |
| Plastic viscosity | 54 cp |
| Yield point | 28 lbs/100 sqft |
| | (13.4 Pa) |
| Gel value 0'/10' | 5/12 lbs/100 sqft |
| | (2.4–4.7 Pa) |
| Ph | 7.8 |
| API dewatering index | 5.0 cm² |
| Cuttings content | 5% Mikhart 130 |
| Sieving capacities achieved | |
| with 40-mesh sieves | greater than 50 m³/hour |
| with 60-mesh sieves | 50 m³/hour |

While a particular embodiment has been chosen to illustrate the invention, it will be understood by those skilled in the art that various changes and modifications can be made therein without departing from the scope of the invention as defined in the appended claims.

I claim:

1. A method of separating and recovering granulate from a viscous suspension containing the granulate, comprising the steps of:

moving an endless sieve belt with a generally horizontal upper run moving in a direction of movement;

placing a layer of the suspension containing granulate on the endless sieve belt so as to form one free edge of the suspension extending across the upper run so that the layer only partially covers the upper run along the length thereof.

separating the granulate as sieve residue on the upper run of the sieve belt and dumping the granulate from the sieve belt after the free edge at one end of the upper run;

passing the suspension through the sieve belt upper run and collecting the suspension between the upper run and a lower run of the sieve belt; and passing a stream of air downwardly through the sieve belt upper run by ventilator means.

2. A method according to claim 1 wherein the stream of air passing through the sieve belt has an average velocity between about four and five meters per second.

3. A method according to claim 2 wherein the sieve belt moves a velocity less than about 30 meters per minute.

4. A method according to claim 1 wherein the sieve belt moves a velocity less than about 30 meters per minute.

5. A method according to claim 1 wherein the layer of the suspension is placed on the sieve belt by pouring the suspension from a height above the sieve belt and permitting the suspension to free fall.

6. A method according to claim 1 wherein the suspension is placed on the sieve belt such that the free edge defines a downstream edge of the suspension layer on the upper run in the direction of movement of the upper run.

7. A method according to claim 1 wherein the upper run of the sieve belt is vibrated.

8. A method according to claim 1 wherein the ventilator means creates an under pressures of less than about 150 millibars.

9. A method according to claim 1 wherein the stream of air passing through the sieve belt has an average velocity at least about one meter per second.

10. A method according to claim 1 wherein the stream of air passing through the sieve belt has an average velocity at least about five meters per second.

11. A method according to claim 1 wherein the suspension containing granulate is spent drilling mud.

12. An apparatus for separating and recovering granulate from a viscous suspension containing the granulate, comprising:

an endless sieve belt having a generally horizontal upper run and a lower run;

a receptacle having an upper support with a plurality of vertical through openings, underlying said upper run of said belt, said receptable being mounted between said upper and lower runs;

dispensing means, mounted adjacent a downstream end of said upper run, for placing a layer of suspension containing granulate on said upper run, said dispensing means including means for forming the layer with one free edge extending across said upper run so that the layer only partially covers said upper run along the length thereof;

first means for receiving, collecting and discharging suspension passed through said upper run and into said receptacle through said upper support;

second means for collecting and discharging granulate collected as sieve residue on said upper run of said sieve belt; and ventilator means, coupled to said receptacle, for generating a stream of air passing downwardly through said upper run and into said receptacle, said ventilator means including blower means, coupled by conduits to said receptacle, for drawing air into said receptacle through said openings in said upper support.

13. An apparatus according to claim 12 vibrating means is coupled to said sieve belt for vibrating said sieve belt.

14. An apparatus according to claim 12 wherein said dispensing means comprises an outlet facing and spaced above said sieve belt by about 20 centimeters.

15. An apparatus according to claim 12 wherein said upper support comprises liquid discharging means for exerting a scraping action on said sieve belt.

16. An apparatus according to claim 12 wherein said ventilator means comprises a lower duct laterally connected to said receptacle and having an open lower end; and a vessel receives said open lower end and is filled with suspension to seal said open lower end against air flow therethrough.

17. An apparatus according to claim 12 wherein said receptacle extends in a cantilever manner from said ventilator means, said ventilator means being generally vertically extending.

18. An apparatus according to claim 12 wherein said dispensing means comprises an outlet facing and spaced above said sieve belt by at least about 20 centimeters.

* * * * *